United States Patent
Shimizu et al.

(10) Patent No.: US 7,141,315 B2
(45) Date of Patent: Nov. 28, 2006

(54) MAGNETIC RECORDING MEDIUM, METHOD OF MANUFACTURING THE SAME, AND MAGNETIC RECORDING AND REPRODUCTION APPARATUS

(75) Inventors: Kenji Shimizu, Ichihara (JP); Akira Sakawaki, Ichihara (JP); Hiroshi Sakai, Ichihara (JP); Takashi Hikosaka, Ome (JP); Futoshi Nakamura, Ome (JP)

(73) Assignees: Showa Denko K.K., Tokyo (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/630,751

(22) Filed: Jul. 31, 2003

(65) Prior Publication Data

US 2004/0023073 A1    Feb. 5, 2004

Related U.S. Application Data

(60) Provisional application No. 60/401,037, filed on Aug. 6, 2002.

(30) Foreign Application Priority Data

Jul. 31, 2002    (JP) .............................. 2002-223199

(51) Int. Cl.
  *G11B 5/66* (2006.01)
  *G11B 5/70* (2006.01)
(52) U.S. Cl. ..................................... 428/828
(58) Field of Classification Search .......... 428/694 TS, 428/694 TM, 336, 900, 831, 828, 832.2
See application file for complete search history.

(56) References Cited

U.S. PATENT DOCUMENTS 6,670,055 B1 *  12/2003  Tomiyasu et al. ...... 428/694 TS
6,777,066 B1 *   8/2004  Chang et al. ................ 428/216

FOREIGN PATENT DOCUMENTS

| JP | 63-211117 A | 9/1988 |
| JP | 08-180360 A | 7/1996 |
| JP | 2669529 B2 | 7/1997 |

* cited by examiner

*Primary Examiner*—Holly Rickman
(74) *Attorney, Agent, or Firm*—Sughrue Mion, PLLC

(57) ABSTRACT

A magnetic recording medium includes a nonmagnetic substrate on which is provided at least a soft magnetic under-film, an orientation control film that controls an orientation of a film directly above, a perpendicular magnetic recording film having an axis of easy magnetization oriented to be mainly perpendicular to the substrate and a protective film, wherein the orientation control film is alloy containing at least Cr and C. The magnetic recording medium is manufactured by a method including carrying out, in order, at least a step of forming a soft magnetic under-film on a nonmagnetic substrate, a step of forming an orientation control film that controls an orientation of a film directly above, a step of forming a perpendicular magnetic recording film having an axis of easy magnetization oriented to be mainly perpendicular to the substrate, and a step of forming a protective film. A magnetic recording and reproduction apparatus includes the magnetic recording medium and a magnetic head that records and reproduces information on the magnetic recording medium, wherein the magnetic head is a magnetic monopole head.

17 Claims, 2 Drawing Sheets

MAGNETIC RECORDING MEDIUM, METHOD OF MANUFACTURING THE SAME, AND MAGNETIC RECORDING AND REPRODUCTION APPARATUS

CROSS REFERENCE TO RELATED APPLICATIONS

This application is an application filed under 35 U.S.C. §111(a) claiming the benefit pursuant to 35 U.S.C. §119(e)(1) of the filing date of Provisional Application No. 60/401,037 filed Aug. 6, 2002 pursuant to 35 U.S.C. §111(b).

DETAILED DESCRIPTION OF THE INVENTION

1. Field of the Invention

The present invention relates to a magnetic recording medium enhanced in recording and reproduction characteristics and capable of high-density information recording and reproduction, a method of manufacturing the same, and a magnetic recording and reproduction apparatus using the magnetic recording medium.

2. Description of Prior Art

The recording density of a hard-disk drive (HDD), which is one kind of magnetic recording and reproduction apparatus, is currently increasing at an annual rate of at least 60%, and it is said that that trend will continue. This being the case, progress is being made with the development of magnetic recording heads suitable for high recording densities, and the development of magnetic recording media.

Magnetic recording media used in magnetic recording and reproduction apparatuses currently on the market are mainly in-plane magnetic recording media in which the axis of easy magnetization in the magnetic film is oriented parallel to the substrate. The axis of easy magnetization refers to the axis along which magnetization readily occurs. In the case of a Co-based alloy, that is the c axis of the hcp structure of the Co.

With such an in-plane magnetic recording medium, when it comes to implementing a high recording density, the volume of the magnetic layer per recording bit becomes too small, so the thermal fluctuation effect can degrade the recording and reproduction characteristics. Also, when implementing high recording densities, media noise tends to be increased by the effect of the demagnetizing field produced in the boundary regions between recording bits.

In contrast, when implementing high recording density in the case of so-called perpendicular recording media in which the axis of easy magnetization in the magnetic film is mainly perpendicular, because the effect of the demagnetizing field in the boundary regions between recording bits is small and a clear bit boundary is formed, noise increase can be held down. Moreover, there is only a small decrease in recording bit density accompanying the implementation of the high recording density, so it is not readily affected by the thermal fluctuation effect. As a result, perpendicular recording media have become the focus of attention in recent years, and various media structures are being proposed that are suited to perpendicular recording as described below.

In recent years, the use of a magnetic monopole head, which has an excellent ability to write to a perpendicular recording film, is being studied with respect to needs to further raise the recording density of magnetic recording media. To use the head, it is being proposed to use a magnetic recording medium in which the efficiency of the magnetic flux transfer between the magnetic monopole head and the magnetic recording medium is improved by the provision of a backing layer constituted of what is called a soft magnetic material between the perpendicular recording film constituting the recording layer and the substrate.

However, a magnetic recording medium thus provided with just a backing layer does not have satisfactory recording and reproduction characteristics during recording and reproduction. What is wanted is a magnetic recording medium with excellent recording and reproduction characteristics.

A perpendicular magnetic recording medium generally comprises a backing layer (soft magnetic underlayer) provided on the substrate, an orientation control film that orients the axis of easy magnetization of the magnetic layer perpendicular to the substrate surface, a perpendicular magnetic recording film of Co alloy, and a protective film, in that order. Of these, it goes without saying to use low-noise magnetic materials for the perpendicular magnetic recording film in order to improve the recording and reproduction characteristics of the magnetic recording medium, but with respect also to the layer structure, the following are examples of a number of proposed improvement techniques.

Japanese Patent No. 2669529 proposes a method in which a Ti under-film is provided between a nonmagnetic substrate and a hexagonal system magnetic alloy film and another element is included in the Ti under-film to improve the lattice matching between the Ti alloy under-film and the hexagonal system magnetic alloy film, improving the c axis orientation of the hexagonal system magnetic alloy film. However, when a Ti alloy base is used, the size of the replacement bonds within the alloy magnetic film increases, resulting in an increase in media noise and making it difficult to obtain a further increase in recording density.

JP-A HEI 8-180360 proposes a method in which an under-film of Co and Ru is used between a nonmagnetic substrate and a Co alloy perpendicular magnetic recording film to improve the c axis orientation of the Co alloy perpendicular magnetic recording film. However, the under-film of Co and Ru has a large crystal grain diameter that results in an increase in the diameter of the magnetic particles in the Co alloy magnetic film, increasing the media noise and making it difficult to obtain a further increase in recording density.

JP-A SHO 63-211117 proposes the use of a carbon-containing under-film between the substrate and the Co alloy perpendicular magnetic recording film. However, when a carbon-containing under-film is used, because the carbon-containing under-film has an amorphous structure, the c axis orientation of the perpendicular magnetic recording film is degraded, degrading the resistance to thermal fluctuation and making it difficult to obtain a further increase in recording density.

In view of the above situation, the object of the present invention is to provide a magnetic recording medium having improved recording and reproduction characteristics that enables high-density recording and reproduction of information, a method of manufacturing the same, and a magnetic recording and reproduction apparatus.

SUMMARY OF THE INVENTION

To achieve the above object the present invention provides a magnetic recording medium having a nonmagnetic substrate on which is provided at least a soft magnetic under-film, an orientation control film that controls an orientation of a film directly above, a perpendicular magnetic recording film having an axis of easy magnetization oriented to be mainly perpendicular to the substrate, and a protective film, wherein the orientation control film is alloy containing at least Cr and C.

In the magnetic recording medium, it is desirable that the orientation control film should have a C content that is not less than 10 at % and not more than 80 at %.

In the magnetic recording medium, it is desirable that the orientation control film should have a C content that is not less than 30 at % and not more than 70 at %.

In the magnetic recording medium, it is desirable that the orientation control film should have a Cr content that is not less than 3 at % and not more than 80 at %.

In the magnetic recording medium, it is desirable that the orientation control film should have a thickness that is not less than. 0.5 nm and not more than 20 nm.

In the magnetic recording medium, it is desirable that the perpendicular magnetic recording film be formed of a material containing at least Co and Pt.

The present invention further provides a method of manufacturing any one of the magnetic recording media, comprising carrying out, in order, at least a step of forming a soft magnetic under-film on a nonmagnetic substrate, a step of forming an orientation control film that controls an orientation of a film directly above, a step of forming a perpendicular magnetic recording film having an axis of easy magnetization oriented to be mainly perpendicular to the substrate, and a step of forming a protective film.

The invention further provides a magnetic recording and reproduction apparatus comprising any one of the magnetic recording media and a magnetic head that records and reproduces information on the magnetic recording medium, wherein the magnetic head is a magnetic monopole head.

As described above, the magnetic recording medium of the present invention has the orientation control film containing at least Cr and C, thereby enabling the recording and reproduction characteristics to be improved.

The above and other objects and features of the present invention will become apparent from the description made herein below with reference to the accompanying drawings.

DETAILED DESCRIPTION OF THE PREFERRED EMBODIMENTS

Figure 1:
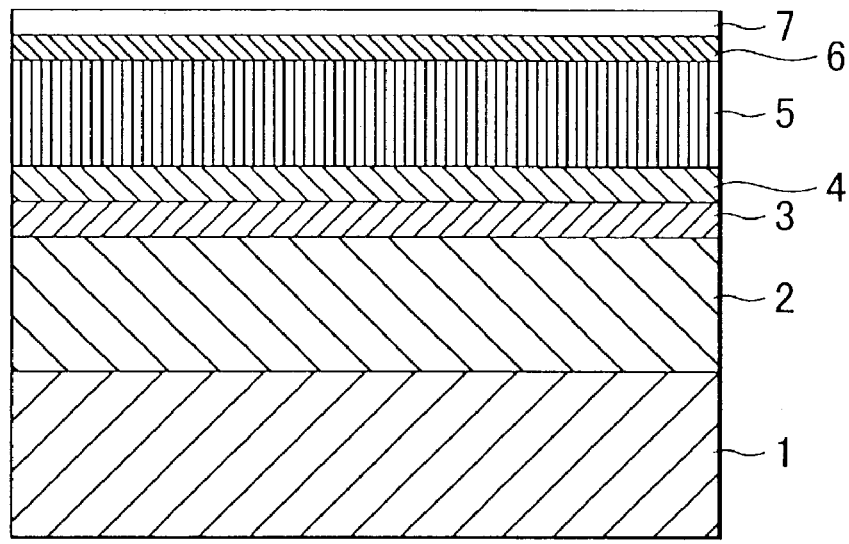
FIG. 1 is a cross-sectional view showing a part of an example of a first embodiment of the magnetic recording medium of this invention.

FIG. 1 shows an example of an aspect of a first embodiment of the magnetic recording medium of the present invention. The magnetic recording medium shown in this figure comprises a soft magnetic under-film 2, an orientation control film 3, an intermediate film 4, a perpendicular magnetic recording film 5, a protective film 6 and a lubricant film 7 deposited in that order on a nonmagnetic substrate 1. The configuration is described below in order from the nonmagnetic substrate 1 side.

The nonmagnetic substrate 1 can be that of a metal material, such as aluminum or aluminum alloy or the like, or that of a non-metallic material, such as glass, ceramics, silicon, silicon carbide or carbon. A glass substrate can be of amorphous glass or glass ceramics. Amorphous glass that can be used includes generic soda-lime glass and alumino silicate glass. The glass ceramics used can be lithium-based glass ceramics. As a ceramics substrate, there can be used a sintered body having generic aluminum oxide, aluminum nitride or silicon nitride as the main component, or a material reinforced with fibers thereof.

To enable low head flotation suitable for high-density recording, the nonmagnetic substrate 1 should have an average surface roughness Ra of not more than 2 nm (20 Å), and preferably not more than 1 nm.

To enable low head flotation suitable for high-density recording, the micro waviness (Wa) of the surface should be not more than 0.3 nm (more preferably, not more than 0.25 nm). Also the surface average roughness Ra of edge chamfered portions and at least one side should be not more than 10 nm (more preferably, not more than 9.5 nm) from the standpoint of head flight stability. The micro waviness (Wa) can be measured, as an average surface roughness within a measurement range of 80 μm, using a P-12 surface roughness measurement system (manufactured by KLA-Tencor Corporation), for example.

The soft magnetic underlayer 2 is provided to more securely fix the magnetization direction of the perpendicular magnetic recording film 5 on which information is recorded perpendicular to the nonmagnetic substrate 1 and to increase the perpendicular component, relative to the substrate, of the magnetic flux generated by the magnetic head. It is desirable for this effect to be particularly pronounced when a magnetic monopole head for perpendicular recording is used as the recording and reproduction magnetic head.

As the soft magnetic material used to form the soft magnetic under-film 2, there can be used material containing Fe, Ni and Co. Specific materials include FeCo-based alloy (FeCo, FeCoV, etc.), FeNi-based alloy (FeNi, FeNiMo, FeNiCr, FeNiSi, etc.), FeAl-based alloy (FeAl, FeAlSi, FeAlSiCr, FeAlSiTiRu, FeAlO, etc.), FeCr-based alloy (FeCr, FeCrTi, FeCrCu, etc.), FeTa-based alloy (FeTa, FeTaC, FeTaN, etc.), FeMg-based alloy (FeMgO, etc.), FeZr-based alloy (FeZrN, etc.), FeC-based alloy, FeN-based alloy, FeSi-based alloy, FeP-based alloy, FeNb-based alloy, FeHf-based alloy and FeB-based alloy. A material having a fine crystal structure, such as FeAlO, FeMgO, FeTaN and FeZrN, containing 60 at % or more Fe can be used, or a material having a granular structure in which fine crystal grains are dispersed in the matrix. Materials that can be used for the soft magnetic under-film 2, in addition to the above, include Co alloy containing at least 80 at % Co and at least one selected from Zr, Nb, Ta, Cr, Mo and the like. CoZr, CoZrNb, CoZrTa, CoZrCr, CoZrMo and other such alloys are particularly suitable.

It is desirable for the coercive force Hc of the softly magnetic under-film 2 to be not more than 100 (Oe) (more preferably, not more than 20 (Oe)). It is undesirable for the coercive force Hc to exceed the above range, since the soft magnetic property will then be not enough and the reproduction waveform will be distorted from a so-called square wave.

The product Bs·t (T·nm) of the saturation magnetic flux density Bs (T) of the soft magnetic under-film 2 and the film thickness t (nm) of the soft magnetic under-film 2 should be not less than 40 (T·nm) (more preferably, not less than 60 (T·nm)). It is undesirable for the Bs·t to be less than that, as the reproduction waveform will then be distorted and the OW characteristics degraded. The thickness of the film layer can be obtained by observation with a TEM (transmission electron microscope).

It is also desirable for the material of the surface of the soft magnetic under-film 2 (the surface on the orientation control film 3 side) to be partially or wholly oxidized. That is, it is desirable for the material of the surface of the softly magnetic under-film 2 (the surface on the orientation control film 3 side) and the vicinity thereof to be partially oxidized, or for oxides of the material to be formed and disposed. Doing this enables magnetic fluctuation of the surface of the soft magnetic under-film 2 to be restrained, reducing noise caused by such magnetic fluctuation, and thereby improving the recording and reproduction characteristics of the magnetic recording medium. Also, recording and reproduction characteristics can be improved by finely granulizing the crystal grains of the orientation control film 3 formed on the soft magnetic under-film 2.

The surface of the softly magnetic under-film 2 (the surface on the orientation control film 3 side) and the vicinity thereof can readily be oxidized, partially or wholly, by, for example, a method in which the soft magnetic under-film 2 is formed and then exposed to an atmosphere containing oxygen, or a method in which oxygen is introduced during formation of near-surface portions of the soft magnetic under-film 2. Specifically, in the case of the method in which the surface of the soft magnetic under-film 2 is exposed to oxygen, it can be maintained from 0.3 to 20 seconds in an oxygen atmosphere or an atmosphere in which oxygen is diluted with argon or nitrogen. It can also be exposed to the air. Particularly when oxygen is diluted with argon or nitrogen, it is easier to adjust the degree of oxidation of the surface of the softly magnetic under-film 2, enabling stable fabrication. Also, in the case of the method in which oxygen is introduced into the gas used to form the film of the soft magnetic under-film 2, if sputtering, for example, is used as the film growth method, it is only necessary to introduce the oxygen into the process gas for just part of the film growth time. In the case of argon as the process gas, for example, oxygen can be mixed at a volumetric ratio of 0.05% to 50% (preferably, 0.1 to 20%).

The orientation control film 3 controls the orientation and grain diameter of the above intermediate film 4 and/or perpendicular magnetic recording film 5. In the magnetic recording medium of this invention, the orientation control film 3 is composed of material containing at least Cr and C.

It is desirable for the orientation control film 3 to further contain one, two or more elements, in addition to Cr and C, not restricted but preferably selected from Ti, Zr, Hf, V, Nb, Ta, Mo and W. It is undesirable for the orientation control film not to contain either Cr or C because the recording and reproduction characteristics become insufficient.

It is also desirable for the orientation control film 3 to have a C content of not less than 10 at % and not more than 80 at % (preferably, not less than 30 at % and not more than 70 at %). When the C content is within the above range, the recording and reproduction characteristics are particularly excellent.

It is further desirable for the orientation control film 3 to have a Cr content of not less than 3 at % and not more than 80 at % (preferably, not less than 5 at % and not more than 50 at %). When the Cr content is within the above range, the recording and reproduction characteristics are particularly excellent.

Further, the orientation control film 3 should have a thickness of not less than 0.5 nm and not more than 20 nm (more preferably, 1 to 12 nm). When the thickness of the orientation control film 3 is within this range, the perpendicular orientation of the perpendicular magnetic recording film 5 becomes particularly high, and the distance between the magnetic head and the soft magnetic under-film 2 during recording can be made small, making it possible to enhance the recording and reproduction characteristics without reducing the resolution of the reproduction signal. If the thickness is less than this range, the perpendicular orientation in the perpendicular magnetic recording film 5 is reduced, degrading the recording and reproduction characteristics and the resistance to thermal fluctuation. If this thickness range is exceeded, the perpendicular orientation of the perpendicular magnetic recording film 5 is reduced, degrading the recording and reproduction characteristics and the resistance to thermal fluctuation. Moreover, the distance between the magnetic head and the soft magnetic under-film 2 during recording is increased, which is not desirable since the reproduction signal resolution and reproduction output is lowered.

The orientation control film 3 is preferably formed as an amorphous or fine crystal structure, which enables the orientation of the intermediate film 4 and/or the perpendicular magnetic recording film 5 provided directly above it to be improved and the particle diameter to become fine. The crystal structure can be confirmed by using the X-ray diffraction method or a transmission electron microscope (TEM).

The shape of the surface of the orientation control film 3 affects the surface shapes of the perpendicular magnetic recording film 5 and protective film 6, so to reduce the unevenness of the magnetic recording medium and reduce the head flotation height during recording and reproduction, it is desirable for the orientation control film 3 to have an average surface roughness Ra of not more than 2 nm. Using an average surface roughness Ra of not more than 2 nm reduces the surface unevenness of the magnetic recording medium and enables the flotation height of the magnetic head during recording and reproduction to be sufficiently reduced, increasing the recording density.

With respect to the gas used to grow the orientation control film 3, it is desirable to use a process gas containing oxygen or nitrogen to refine the perpendicular magnetic recording film formed thereon If the film is formed using the sputtering method, for example, as the film-growing method, it is desirable to use oxygen mixed with argon at a volumetric ratio of 0.05 to 50% (more preferably, 0.1 to 20%), or nitrogen mixed with argon at a volumetric ratio of 0.01 to 20% (more preferably, 0.02 to 10%).

As shown in the illustrated example, an intermediate film 4 can be provided between the orientation control film 3 and the perpendicular magnetic recording film. For this intermediate film 4, it is desirable to use a material having an hcp structure, with CoCr alloy, CoCrYl alloy or CoYl alloy (YL: one, two or more selected from Pt, Ta, Zr, Ru, Nb, Cu, Re, Ni, Mn, Ge, Si, 0, N and B) being particularly suitable. The intermediate film 4 should preferably contain 30 to 70 at % Co. The intermediate film 4 should preferably be not more than 30 nm thick (more preferably, not more than 20 nm) to prevent the recording and reproduction characteristics being deteriorated by coarsening of the magnetic particles in the perpendicular magnetic recording film 5, and to prevent the recording resolution being reduced by an increase in the distance between the magnetic head and the soft magnetic under-film 2. Thus, providing the intermediate film 4 enables the perpendicular orientation of the perpendicular magnetic recording film 5 to be increased, raising the coercive force of the perpendicular magnetic recording film 5 and further improving the recording and reproduction characteristics and the resistance to thermal fluctuation.

The axis of easy magnetization of the perpendicular magnetic recording film 5 is oriented mainly perpendicular to the substrate, and the film preferably is formed of a material containing at least Cr and Pt. It is desirable to form it of a material containing at least Cr and Pt, the Cr content being not less than 14 at % and not more than 24 at % (more preferably, not less than 16 at % and not more than 22 at %), and the Pt content being not less than 14 at % and not more than 24 at % (more preferably, not less than 15 at % and not more than 20 at %). By mainly perpendicular is meant a perpendicular magnetic recording film in which perpendicular coercive force Hc (P) and in-plane coercive force Hc (L) are Hc (P)>Hc (L). It is also desirable to use a material containing not less than 0.1 and not more than 5 at % B. This enables the exchange couplings between magnetic particles to be reduced, making it possible to improve the recording and reproduction characteristics. It is undesirable for the material composition to have a Cr content that is less than 14 at %, since the exchange couplings between the magnetic particles will then be increased, increasing the diameter of the magnetic clusters and thereby increasing the noise. It is also not desirable for the Cr content to be more than 24 at %, since that will reduce the ratio Mr/Ms between remanent magnetization (Mr) and saturation magnetization (Ms). If the Pt content is less than 14 at %, the improvement effect on the recording and reproduction characteristics will not be sufficient, lowering the Mr/Ms ratio between the remanent magnetization (Mr) and the saturation magnetization (Ms) and the resistance to thermal fluctuation. A Pt content that is more than 24 at % is not desirable, since noise will increase.

When the perpendicular magnetic recording film 5 is formed of CoCrPt-based alloy, any element other than B can be added as desired. There is no particular limitation, but V, Ta, Mo, Nb, Hf, Cu, Ru, Nd, Zr, W, Nd, Si and O are among those that can be mentioned.

The perpendicular magnetic recording film 5 can be, a one-layer structure comprised of CoPt-based, material, or a structure comprised of two or more layers of materials having different compositions. In the case of a structure of two or more layers, a multilayer structure can be used comprised of layers of Co-based alloy (CoCr, CoB, Co—SiO$_2$, etc.) and Pd-based alloy (PdB, Pd—SiO$_2$, etc.), or comprised of amorphous material, such as CoTb and CoNd, and CoCrPt-based material. Or, CoPt-based material can be provided as a first perpendicular magnetic recording film, and CoPt-based material having a different composition as a second perpendicular magnetic recording film. Also, CoPt-based material can be provided as a first perpendicular magnetic recording film, and CoNd as a second perpendicular magnetic recording film.

It is desirable for the thickness of the perpendicular magnetic recording film 5 to be 7 to 60 nm (more preferably, 10 to 40 nm). A perpendicular magnetic recording film 5 thickness of 7 nm or more is desirable, since sufficient magnetic flux can be obtained, there is no decrease in output during reproduction, and there is no eddy leakage in the noise component of the output waveform, resulting in magnetic recording and reproduction apparatus operation suitable for higher recording density. Also, a perpendicular magnetic recording film 5 thickness that is not more than 60 nm is desirable, since it enables coarsening of the magnetic particles in the perpendicular magnetic recording film 5 to be suppressed, so there is no risk of degradation of recording and reproduction characteristics caused by increased noise.

It is desirable for the perpendicular magnetic recording film 5 to have a coercive force of not less than 3000 (Oe). A coercive force that is less than 3000 (Oe) is undesirable since it prevents the obtaining of the necessary high recording density resolution, and also degrades the resistance to thermal fluctuation.

In addition, it is also desirable for the ratio Mr/Ms between the remanent magnetization (Mr) and the saturation magnetization (Ms) of the perpendicular magnetic recording film 5 to be not less than 0.9. An Mr/Ms ratio of less than 0.9 is undesirable because it degrades the thermal fluctuation resistance of the magnetic recording medium.

It is also desirable for the inverse magnetic domain nucleation field (−Hn) of the perpendicular magnetic recording film 5 to be not less than 0 and not more than 2500 (Oe). It is undesirable for the magnetic recording medium to have an inverse magnetic domain nucleation field (−Hn) that is less than 0, since thermal fluctuation resistance is degraded. The upper limit of the inverse magnetic domain nucleation field (−Hn) is set at 2500 (Oe). An attempt to obtain a higher inverse magnetic domain nucleation field (−Hn) can result in the magnetic particles having insufficient magnetic separation, increasing the active magnetic moment (vIsb) and producing an increase in noise during recording and reproduction.

It is desirable for the crystal grains of the perpendicular magnetic recording film 5 to have an average grain diameter of 5 to 15 nm. The average grain diameter can be obtained through observing the crystal grains of the perpendicular magnetic recording film 5 with a TEM (transmission electron microscope) and processing the observed images.

It is desirable for the $\Delta$Hc/Hc of the perpendicular magnetic recording film 5 to be not more than 0.3. A $\Delta$Hc/Hc of not more than 0.3 is desirable since it reduces variation in the diameter of the magnetic particles, producing a more uniform coercive force in the perpendicular direction of the perpendicular magnetic recording film, and therefore deterioration of the recording and reproduction characteristics and thermal fluctuation resistance can be held in check.

The protective film 6 protects the perpendicular magnetic recording film 5 from corrosion and also protects the medium surface from damage when the magnetic head contacts the medium. The protective film 6 can be formed of a conventional, known material, such as one containing C, SiO$_2$ and ZrO$_2$. From the standpoint of high recording density, it is desirable for the protective film 6 to have a thickness set at 1 to 10 nm, since this makes it possible to reduce the distance between the head and the perpendicular magnetic recording film 5.

For the lubricant film 7, it is desirable to use a conventional, known material, such as perfluoropolyether, alcohol fluorine, carboxylic acid fluorine, etc.

The magnetic recording medium constituted of the layers each having the configuration as mentioned above, which is the first invention of the present invention, has an orientation control film formed of alloy containing at least Cr and C, improving the recording and reproduction characteristics (lower noise, for example) when used at higher recording densities, thus forming a magnetic recording medium that enables high-density information recording and reproduction.

Figure 2:
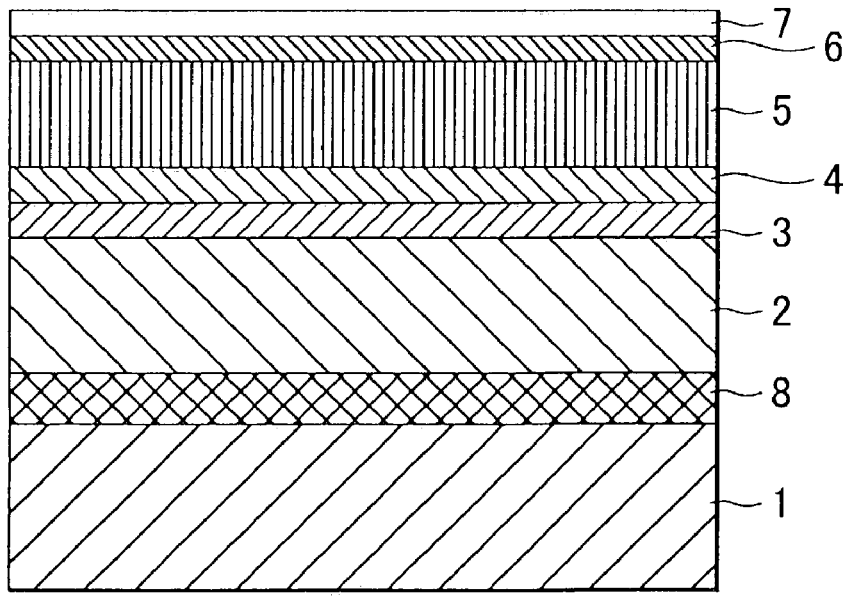
FIG. 2 is a cross-sectional view of a part of an example of a second embodiment of the magnetic recording medium of this invention.

FIG. 2 shows an example of an aspect of a second embodiment of the magnetic recording medium of the present invention, in which a permanent magnetic film 8 with mainly in-plane oriented magnetic anisotropy is provided between the nonmagnetic substrate 1 and the soft magnetic under-film 2 of the first embodiment.

The permanent magnetic film 8 can be formed of CoSm alloy or CoCrPtY2 alloy (Y2: one, two or more selected from Pt, Ta, Zr, Nb, Cu, Re, Ni, Mn, Ge, Si, O, N and B) being suitable. It is desirable for the coercive force Hc of the permanent magnetic film 8 to be not less than 500 (Oe) (more preferably, not less than 1000 (Oe)). It is also desirable for the permanent magnetic film 8 to have a thickness that is not more than 150 nm (more preferably, not more than 70 nm). It is undesirable for the thickness to exceed 150 nm, since it would increase the average surface roughness Ra of the orientation control film 3. It is also desirable for the permanent magnetic film 8 to be composed to be exchange-coupled to the soft magnetic under-film 2, with magnetization oriented in the radial direction of the substrate.

Providing the permanent magnetic film 8 enables the formation of giant magnetic domains in the soft magnetic under-film 2 to be more effectively controlled, preventing noise spikes from the magnetic walls and adequately lowering the error rate during recording and reproduction.

A B2 structure material or Cr alloy material can be used between the nonmagnetic substrate 1 and the permanent magnetic film 8 to control the orientation of the permanent magnetic film 8.

Next, an example of a method of manufacturing the magnetic recording medium according to the first (and second) embodiments will be described. First, the soft magnetic under-film 2 is formed on the nonmagnetic substrate 1 by a method, such as sputtering. Then, if required, the surface of the soft magnetic under-film 2 and the vicinity thereof are partially or wholly oxidized. Next, a method, such as sputtering, is used to form the orientation control film 3, intermediate film 4 and perpendicular magnetic recording film 5. Then, the protective film 6 is formed by a method, such as the CVD method, ion-beam method or sputtering method. Then, the lubricant film 7 is formed by the dipping method, spin-coating method or the like. When manufacturing the magnetic recording medium of the second embodiment, the step of forming the permanent magnetic film 8 between the nonmagnetic substrate 1 and the soft magnetic under-film 2 can be included. Below, each process is explained.

If required, the nonmagnetic substrate 1 is washed and the nonmagnetic substrate 1 is placed in the chamber of the film formation apparatus. Also, if required, a heater, for example, is used to heat the nonmagnetic substrate 1 to a temperature of 100 to 400° C. Then, the soft magnetic under-film 2, orientation control film 3, intermediate film 4 and perpendicular magnetic recording film 5 are formed on the nonmagnetic substrate 1 by DC or RF magnetron sputtering using a sputter target of a material having the same composition as the material of each layer. The sputtering conditions used to form the films are set as follows, for example. The chamber used for the formation is evacuated to a vacuum of $10^{-5}$ to $10^{-7}$ Pa. The nonmagnetic substrate 1 is placed in the chamber and Ar gas, for example, as the sputter gas, is introduced and a discharge used to perform sputter film formation. The power supplied at this time is 0.2 to 5 kW, and the discharge time and supplied power are regulated to obtain the desired film thickness. Specifically, a film thickness of 50 to 400 nm is desirable.

In forming the soft magnetic under-film 2, it is desirable to use sputter targets (fused alloy targets or sintered alloy targets) made of the types of soft magnetic material described above, to facilitate formation of the soft magnetic under-film.

After forming the soft magnetic under-film 2, it is desirable to carry out the aforementioned process of partially or wholly oxidizing the surface thereof (on the orientation control film 3 side) by, for example, using a method in which, after the soft magnetic under-film 2 is formed, it is exposed to an oxygen-containing atmosphere, or a method in which oxygen is introduced into the process during growth of near-surface portions of the soft magnetic under-film 2.

After forming the soft magnetic under-film 2, the orientation control film 3 is formed to a film thickness of 1 to 20 nm (more preferably, 1 to 10 nm) by regulating the discharge time and supplied power.

In forming the orientation control film 3, it is desirable to use a sputter target made of the type of orientation control film material described above, to facilitate formation of the orientation control film. The sputter target material used to form the orientation control film 3 is an alloy containing at least Cr and C.

As already described, oxygen or nitrogen can be introduced into the gas used to grow the orientation control film 3 with the aim of refining the perpendicular magnetic recording film.

The perpendicular magnetic recording film 5 is formed after forming the orientation control film 3. In forming the perpendicular magnetic recording film, it is desirable to use a sputter target made of the type of perpendicular magnetic recording film material described above, to facilitate formation of the perpendicular magnetic recording film. Specifically, it is desirable for the sputter target material to have a composition containing as the main component CoCrPt wherein a Cr content is not less than 14 at % and not more than 24 at % and a Pt content is not less than 14 at % and not more than 24 at %.

As already described, an intermediate film 4 can be provided between the orientation control film 3 and the perpendicular magnetic recording film 5 to increase the perpendicular orientation of the perpendicular magnetic recording film 5 and increase the coercive force of the perpendicular magnetic recording film 5, to further improve recording and reproduction characteristics and thermal fluctuation resistance.

After forming the perpendicular magnetic recording film 5, the sputtering method or plasma CVD method, or a combination thereof, for example, is used to form the protective film 6, such as a protective film having carbon as the main component.

Also, if required, a lubricant film 7 of perfluoropolyether or other such fluorine-based lubricating agent can be applied onto the protective film 6 by a method, such as dipping or spin coating.

The magnetic recording medium manufactured by the method of manufacturing the magnetic recording medium that is the second invention of the present invention constituted of these processes, and which can be implemented using the sputtering method or the like, is a magnetic recording medium in which the orientation control film 3 is formed of alloy containing at least Cr and C, improving the recording and reproduction characteristics (lower noise, for example) when used at higher recording densities, thus forming a magnetic recording medium that enables high-density information recording and reproduction.

Figure 3A:
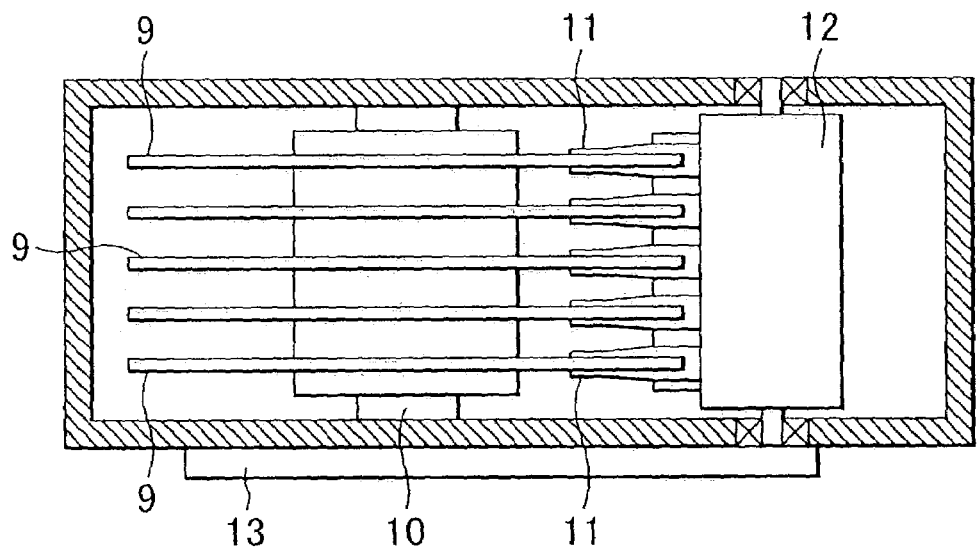
FIG. 3(a) is a schematic cross section showing an example of a magnetic recording and reproduction apparatus of the present invention.
Figure 3B:
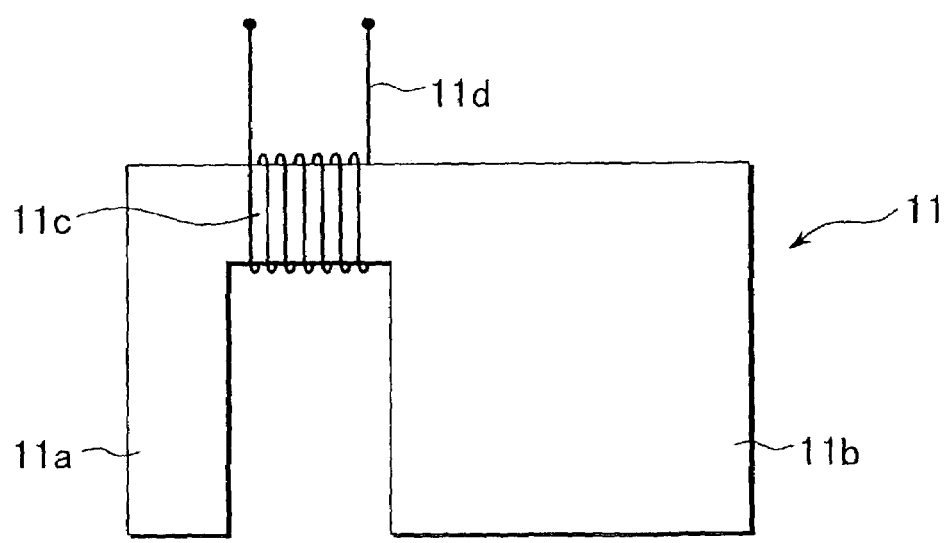
FIG. 3(b) is an enlarged view showing an example of the magnetic head of the magnetic recording and reproduction apparatus of FIG. 3(a).

FIG. 3 shows an example of a magnetic recording and reproduction apparatus, which is an example of an aspect of the third invention of the present invention, using a magnetic recording medium that is the first invention and is manufactured in accordance with the second invention. The magnetic recording and reproduction apparatus shown here includes a magnetic recording medium 9, a medium drive section 10 that rotates the magnetic recording medium 9, a magnetic head 11 that records information on the magnetic recording medium 9 and reproduces the recording, a head drive section 12 and a recording and reproduction signal processing system 13. The recording and reproduction signal processing system 13 is able to process input data and send recording signals to the magnetic head 11, and process reproduction signals from the magnetic head 11 and output the data. The magnetic head 11 can, for example, be a magnetic monopole head for perpendicular recording applications. A suitable magnetic monopole head is one, as shown in FIG. 3(a), having a configuration provided with a main pole 11a, an auxiliary pole 11b, a connecting section 11c that connects these, and a coil 11d provided on the connecting section 11c.

This magnetic recording and reproduction apparatus uses the magnetic recording medium 9 having the aforementioned configuration, enabling the recording and reproduction characteristics to be improved and preventing troubles, such as date disappearance, owing to thermal fluctuation from occurring, helping to achieve high recording density.

Examples are shown below to clarify the action and effect of the present invention, but the invention is not limited to these Examples.

EXAMPLE 1

A washed glass substrate (manufactured by Ohara Inc., Japan, with an outside diameter of 2.5 inches) was placed in the film formation chamber of the DC magnetron sputter apparatus (C-3010 manufactured by Anelva Corp., Japan). After the film formation chamber was evacuated until a vacuum of $1 \times 10^{-5}$ Pa was achieved, using an 89Co-4Zr-7Nb (Co content 89 at %, Zr content 4 at %, Nb content 7 at %) target, a 160-nm soft magnetic under-film 2 was formed on the glass substrate by the sputtering method. Using a vibrating sample magnetometer (VSM), the product B·s·t (T·nm) of the saturation magnetic flux density Bs (T) of the film and the film thickness t (nm) was confirmed to be 200 (Tnm). Next, the substrate was heated to 240° C. and a 30Cr-50C-20W target was used to form an 5-nm orientation control film on the soft magnetic under-film. A 65Co-30Cr-5B (Co content 65 at %, Cr content 30 at %, B content 5 at %) target was used to form a 10-nm intermediate film, and a 64Co-17Cr-17Pt-2B (Co content 64 at %, Cr content 17 at %, Pt content 17 at %, B content 2 at %) target was then used to form a 20-nm perpendicular magnetic recording film. For the above sputtering process, argon was used as the film growth process gas, and the film was formed at a pressure of 0.6 Pa. Next, the CVD method was used to form a 5-nm protective film 6. Next, the dipping method was used to form a lubricant film of perfluoropolyether, to thereby obtain a magnetic recording medium. The contents thereof are shown in Table 1.

COMPARATIVE EXAMPLES 1 TO 3

Except that 60Ru-40Co, Ti and C targets were used, Example 1 was used as a basis for fabricating magnetic recording media. The contents are shown in Table 1.

Recording and reproduction characteristics of the magnetic recording media of Example 1 and Comparative Examples 1 to 3 were evaluated. For the evaluation of the recording and reproduction characteristics, measurements were made with the RWA1632 Read/Write Analyzer and the S1701 MP Spin-Stand manufactured by Guzik Corp. of the U.S. For the evaluation of the recording and reproduction characteristics, a head was used having a single-pole for writes and a reproduction section with a GMR element, and measurements were taken using a linear recording density of 600 kFCI as the recording frequency condition. Test results are shown in Table 1.

TABLE 1

|  | Soft Magnetic Under-film | | Orientation Control Film | | Intermediate Film | | Perpendicular Magnetic Recording Film | |
|---|---|---|---|---|---|---|---|---|
|  | Composition | Bs x t (T nm) | Composition (at %) | Thickness (nm) | Composition (at %) | Thickness (nm) | Composition (at %) | Thickness (nm) |
| Example 1 | CoZrNb | 200 | 30Cr—50C—20W | 5 | 65Co—30Cr—5B | 10 | 64Co—17Cr—17Pt—2B | 20 |
| Comp. Example 1 | CoZrNb | 200 | 60Ru—40Co | 15 | 65Co—30Cr—5B | 10 | 64Co—17Cr—17Pt—2B | 20 |
| Comp. Example 2 | CoZrNb | 200 | Ti | 20 | 65Co—30Cr—5B | 10 | 64Co—17Cr—17Pt—2B | 20 |
| Comp. Example 3 | CoZrNb | 200 | C | 5 | 65Co—30Cr—5B | 10 | 64Co—17Cr—17Pt—2B | 20 |

|  | Recording/Reproduction Characteristics Error rate ($10^x$) | Hc (Oe) | Mr/Ms | —Hn (Oe) |
|---|---|---|---|---|
| Example 1 | −5.6 | 4255 | 1.00 | 500 |

TABLE 1-continued

|   |   |   |   |   |
|---|---|---|---|---|
| Comp. Example 1 | −4.1 | 4250 | 0.77 | 100 |
| Comp. Example 2 | −2.1 | 3590 | 1.00 | 400 |
| Comp. Example 3 | −3.2 | 3760 | 0.88 | 100 |

As is clear from Table 1, the magnetic recording medium of Example 1 in which the orientation control film was formed of 30Cr-50C-20W alloy, exhibited superior recording and reproduction characteristics to Comparative Examples 1 to 3.

EXAMPLES 2 to 13

Example 1 was used as a basis for fabricating magnetic recording media of Examples 2 to 13, except for the composition of the orientation control film as shown in Table 2. For the sake of comparison, the intermediate film and perpendicular magnetic recording film were given the same composition and thickness.

Recording and reproduction characteristics of the magnetic recording media of Examples 2 to 13 were evaluated. Test results are shown in Table 2.

As is clear from Table 2, the magnetic recording media of Examples 2 to 13 in which the orientation control film had a composition of Cr—C—X, exhibited superior recording and reproduction characteristics.

EXAMPLES 14 to 18

Example 1 was used as a basis for fabricating magnetic recording media of Examples 14 to 18, except for the thickness of the orientation control film as shown in Table 3. For the sake of comparison, the orientation control films were given the same composition. Also, the soft magnetic under-film, intermediate film and perpendicular magnetic recording film were given the same composition and thickness.

Recording and reproduction characteristics of the magnetic recording media of Examples 14 to 18 were evaluated. Test results are shown in Table 3.

TABLE 2

|  | Soft Magnetic Under-film | | Orientation Control Film | | Intermediate Film | |
|---|---|---|---|---|---|---|
|  | Composition | Bs x t (T nm) | Composition (at %) | Thickness (nm) | Composition (at %) | Thickness (nm) |
| Example 1 | CoZrNb | 200 | 35Cr—45C—20W | 5 | 65Co—30Cr—5B | 10 |
| Example 2 | CoZrNb | 200 | 25Cr—75C | 5 | 65Co—30Cr—5B | 10 |
| Example 3 | CoZrNb | 200 | 35Cr—65C | 5 | 65Co—30Cr—5B | 10 |
| Example 4 | CoZrNb | 200 | 65Cr—35C | 5 | 65Co—30Cr—5B | 10 |
| Example 5 | CoZrNb | 200 | 75Cr—15C—10W | 5 | 65Co—30Cr—5B | 10 |
| Example 6 | CoZrNb | 200 | 35Cr—45C—20Ti | 5 | 65Co—30Cr—5B | 10 |
| Example 7 | CoZrNb | 200 | 35Cr—45C—20Zr | 5 | 65Co—30Cr—5B | 10 |
| Example 8 | CoZrNb | 200 | 35Cr—45C—20Hf | 5 | 65Co—30Cr—5B | 10 |
| Example 9 | CoZrNh | 200 | 35Cr—45C—20V | 5 | 65Co—30Cr—5B | 10 |
| Example 10 | CoZrNh | 200 | 35Cr—45C—20Nh | 5 | 65Co—30Cr—5B | 10 |
| Example 11 | CoZrNb | 200 | 35Cr—4SC—20Ta | 5 | 65Co—30Cr—SB | 10 |
| Example 12 | CoZrNb | 200 | 35Cr—45C—20Mo | 5 | 65Co—30Cr—5B | 10 |
| Example 13 | CoZrNh | 200 | 5Cr—65C—30W | 5 | 65Co—30Cr—SB | 10 |

|  | Perpendicular Magnetic Recording Film | | Recording/Reproduction Characteristics |
|---|---|---|---|
|  | Composition (at %) | Thickness nm | Error rate ($10^x$) |
| Example 1 | 64Co—17Cr—17P1—2B | 20 | −5.6 |
| Example 2 | 64Co—17Cr—17Pt—2B | 20 | −5.1 |
| Example 3 | 64Co—17Cr—17Pt—2B | 20 | −5.3 |
| Example 4 | 64Co—17Cr—17Pt—2B | 20 | −5.4 |
| Example 5 | 64Co—17Cr—17Pt—2B | 20 | −5.2 |
| Example 6 | 64Co—17Cr—17Pt—2B | 20 | −5.5 |
| Example 7 | 64Co—17Cr—17Pt—2B | 20 | −5.7 |
| Example 8 | 64Co—17Cr—17Pt—2B | 20 | −5.3 |
| Example 9 | 64Co—17Cr—17Pt—2B | 20 | −5.6 |
| Example 10 | 64Co—17Cr—17Pt—2B | 20 | −5.6 |
| Example 11 | 64Co—17Cr—17Pt—2B | 20 | −5.6 |
| Example 12 | 64Co—17Cr—17Pt—2B | 20 | −5.8 |
| Example 13 | 64Co—17Cr—17Pt—2B | 20 | −5.1 |

TABLE 3

| | Soft Magnetic Under-film | | Orientation Control Film | | Intermediate Film | | Perpendicular Magnetic Recording Film | | Recording/Reproduction Characteristics |
|---|---|---|---|---|---|---|---|---|---|
| | Composition | Bs x t (T nm) | Composition (at %) | Thickness (nm) | Composition (at %) | Thickness (nm) | Composition (at %) | Thickness (nm) | (Error rate) ($10^x$) |
| Example 1 | CoZrNh | 200 | 35Cr—45C—20W | 5 | 65Co—30Cr—5B | 10 | 64Co—17Cr—17Pt—2B | 20 | −5.6 |
| Example 14 | CoZrNb | 200 | 35Cr—45C—20W | 0.6 | 65Co—30Cr—5B | 10 | 64Co—17Cr—17Pt—2B | 20 | −5.2 |
| Example 15 | CoZrNb | 200 | 35Cr—45C—20W | 1.5 | 65Co—30Cr—5B | 10 | 64Co—17Cr—17Pt—2B | 20 | −5.4 |
| Example 16 | CoZrNb | 200 | 35Cr—45C—20W | 11 | 65Co—30Cr—5B | 10 | 64Co—17Cr—17Pt—2B | 20 | −5.3 |
| Example 17 | CoZrNb | 200 | 35Cr—45C—20W | 18 | 65Co—30Cr—5B | 10 | 64Co—17Cr—17Pt—2B | 20 | −5.2 |
| Example 10 | CoZrNb | 200 | 35Cr—45C—20W | 30 | 65Co—30Cr—SB | 10 | 64Co—17Cr—17Pt—2B | 20 | −4.9 |

As is clear from Table 3, the magnetic recording media of Examples 14 to 17 in which the thickness of the orientation control film was not less than 0.5 nm and not more than 20 nm (particularly not less than 1 nm and not more than 12 nm in Examples 15 and 16) showed particularly good recording and reproduction characteristics.

As described in the foregoing, the magnetic recording medium of the present invention comprises, on a nonmagnetic substrate, at least a soft magnetic under-film, an orientation control film for controlling orientation of the film above, a perpendicular magnetic recording film having an axis of easy magnetization oriented mainly perpendicular to the substrate and a protective film, in which the orientation control film is composed of alloy containing at least Cr and C, enabling the recording and reproduction characteristics to be improved.

What is claimed is:

1. A magnetic recording medium having a nonmagnetic substrate on which is provided at least a soft magnetic under-film, an orientation control film that is in direct contact with the soft magnetic layer and controls an orientation of a film directly above, a perpendicular magnetic recording film having an axis of easy magnetization oriented to be mainly perpendicular to the substrate, and a protective film, wherein the orientation control film is an alloy containing at least Cr and C, wherein the film that is directly above is the perpendicular magnetic recording film and is in direct contact with the orientation control film.

2. The magnetic recording medium according to claim 1, wherein the orientation control film has a C content that is not less than 10 at % and not more than 80 at %.

3. The magnetic recording medium according to claim 1, wherein the orientation control film has a C content that is not less than 30 at % and not more than 70 at %.

4. The magnetic recording medium according to claim 1, wherein the orientation control film has a Cr content that is not less than 3 at % and not more than 80 at %.

5. The magnetic recording medium according to claim 1, wherein the orientation control film has a thickness that is not less than 0.5 nm and not more than 20 nm.

6. The magnetic recording medium according to claim 2, wherein the orientation control film has a thickness that is not less than 0.5 nm and not more than 20 nm.

7. The magnetic recording medium according to claim 1, wherein the perpendicular magnetic recording film is formed of a material containing at least Co and Pt.

8. The magnetic recording medium according to claim 2, wherein the perpendicular magnetic recording film is formed of a material containing at least Co and Pt.

9. A method of manufacturing the magnetic recording medium according to claim 1, comprising carrying out, in order, at least a step of forming a soft magnetic under-film on a nonmagnetic substrate, a step of forming an orientation control film that controls an orientation of a film directly above, a step of forming a perpendicular magnetic recording film having an axis of easy magnetization oriented to be mainly perpendicular to the substrate, and a step of forming a protective film.

10. A method of manufacturing the magnetic recording medium according to claim 2, comprising carrying out, in order, at least a step of forming a soft magnetic under-film on a nonmagnetic substrate, a step of forming an orientation control film that controls an orientation of a film directly above, a step of forming a perpendicular magnetic recording film having an axis of easy magnetization oriented to be mainly perpendicular to the substrate, and a step of forming a protective film.

11. A magnetic recording and reproduction apparatus comprising the magnetic recording medium according to claim 1 and a magnetic head that records and reproduces information on the magnetic recording medium, wherein the magnetic head is a magnetic monopole head.

12. A magnetic recording and reproduction apparatus comprising the magnetic recording medium according to claim 2 and a magnetic head that records and reproduces information on the magnetic recording medium, wherein the magnetic head is a magnetic monopole head.

13. A magnetic recording medium having a nonmagnetic substrate on which is provided at least a soft magnetic under-film, an orientation control film that is in direct contact with the soft magnetic layer and controls an orientation of a film directly above, a perpendicular magnetic recording film having an axis of easy magnetization oriented to be mainly perpendicular to the substrate, an intermediate film between the perpendicular magnetic recording film and the orientation control film, and a protective film, wherein the orientation control film is in direct contact with the intermediate film which is direct contact with the perpendicular recording film, and the orientation control film is an alloy containing at least Cr and C.

14. The magnetic recording medium according to claim 13, wherein the intermediate film is made from an hcp structure alloy and has a Co content that is not less than 30 at % and not more than 70 at %.

15. The magnetic recording medium according to claim 13, wherein the intermediate film has a thickness that is not more than 30 nm.

16. The magnetic recording medium according to claim 13, wherein the orientation control film has a C content that is not less than 10 at % and not more than 80 at %.

17. The magnetic recording medium according to claim 1, wherein the orientation control film has a C content that is not less than 30 at % and not more than 70 at %.

* * * * *